United States Patent [19] [11] 4,088,224
Kittredge [45] May 9, 1978

[54] POWERED ROLLER CONVEYOR

[75] Inventor: Gifford Kittredge, New Canaan, Conn.

[73] Assignee: W & H Conveyor Systems, Inc., Carlstadt, N.J.

[21] Appl. No.: 743,548

[22] Filed: Nov. 22, 1976

[51] Int. Cl.² .................................................. B65G 13/02
[52] U.S. Cl. ........................................ 198/783; 198/790
[58] Field of Search ............... 198/781, 783, 790, 459, 198/461, 575–577, 579, 858, 859, 857, 470

[56] References Cited

U.S. PATENT DOCUMENTS

| 3,225,893 | 12/1965 | Currie | 198/857 |
| 3,612,247 | 10/1971 | Pipp | 198/857 |
| 3,612,248 | 10/1971 | Wallis | 198/857 |
| 3,768,630 | 10/1973 | Inwood et al. | 198/781 |
| 3,992,182 | 11/1976 | Frank | 198/461 |

FOREIGN PATENT DOCUMENTS 246,101  3/1926  United Kingdom ............... 198/783

Primary Examiner—Bruce H. Stoner, Jr.
Assistant Examiner—Joseph E. Valenza
Attorney, Agent, or Firm—Seidel, Gonda & Goldhammer

[57] ABSTRACT

Parallel rollers of a roller conveyor are divided into discrete groups and progressively rotated by groups in a sequential manner whereby a load may be caused to continuously move along the conveyor. The first roller of a group of rollers starts rotating before the last roller of a previous group stops rotating. The total number of rollers which are rotatably driven at any given time is substantially less than the total number of rollers.

8 Claims, 5 Drawing Figures

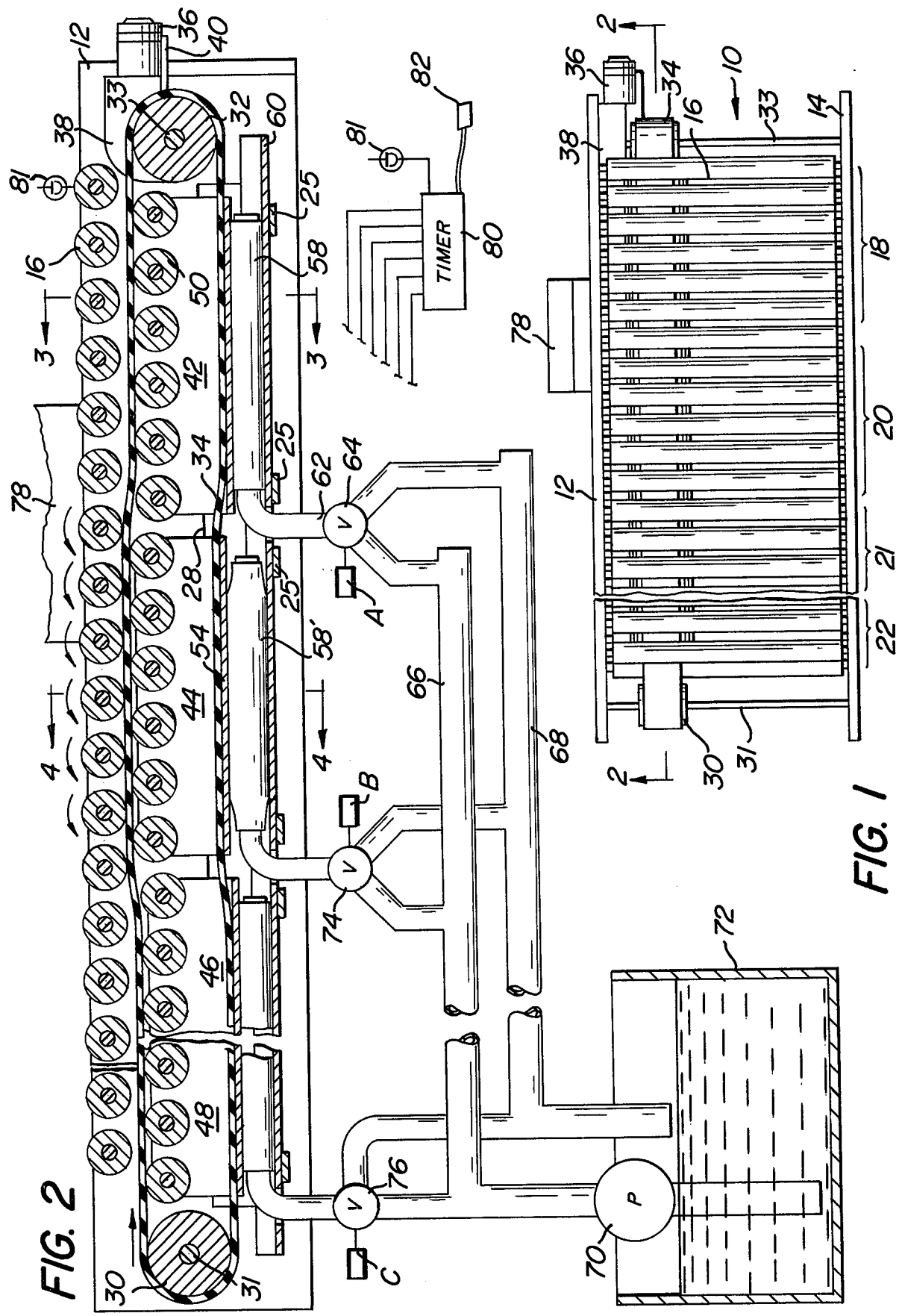

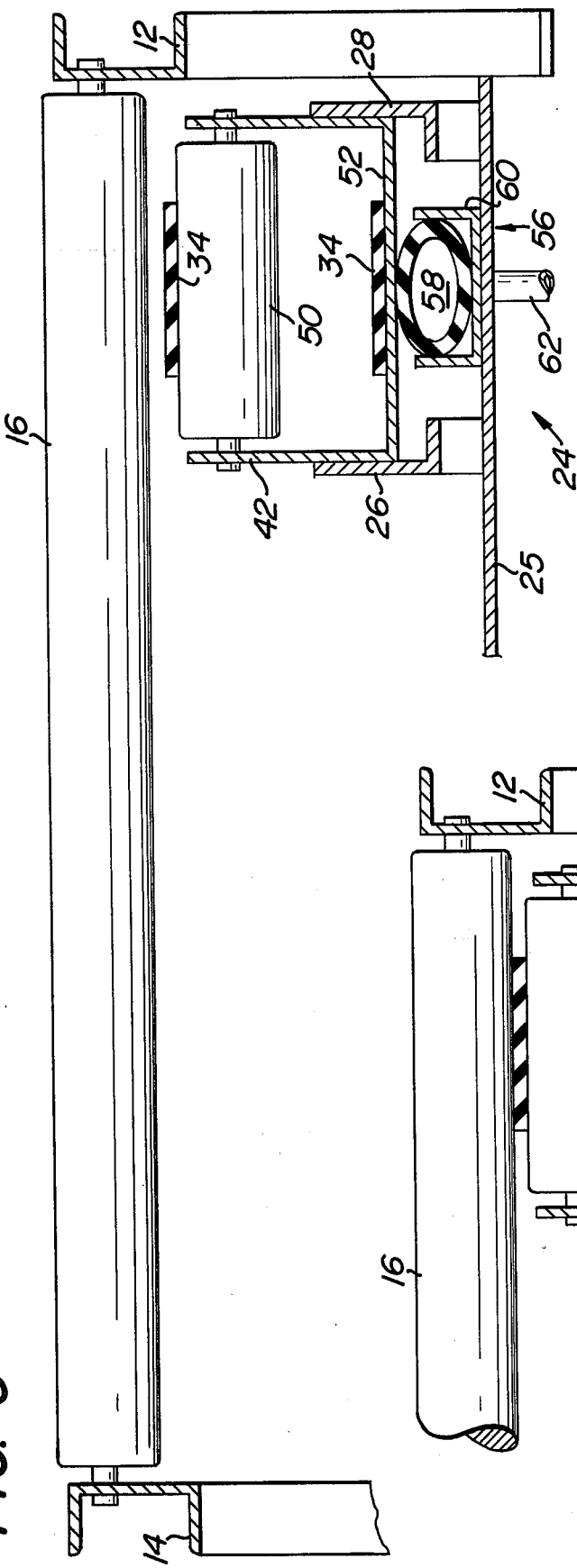
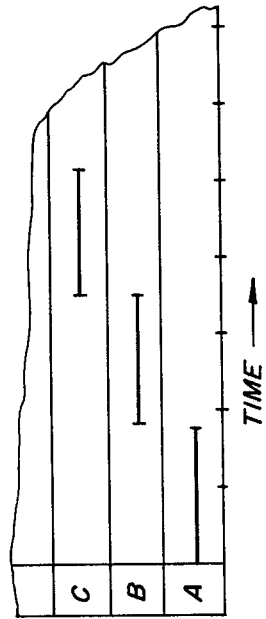
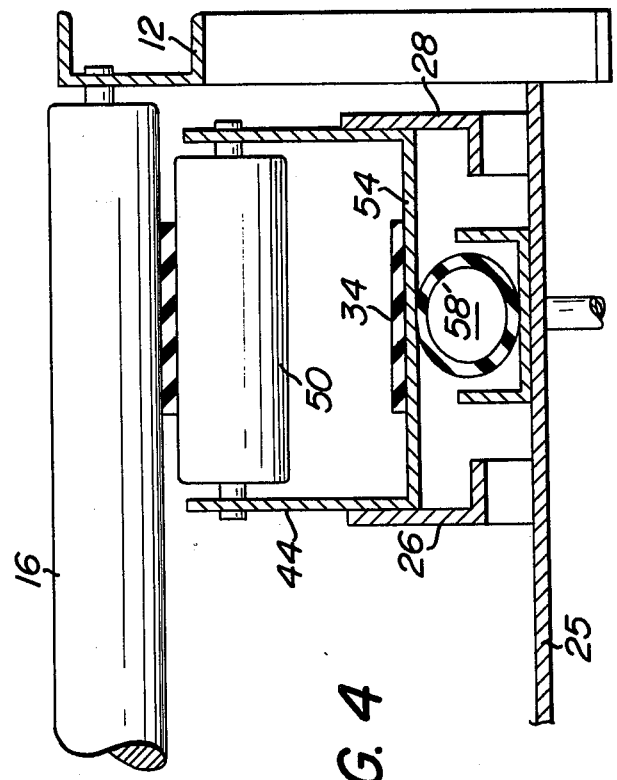
FIG. 3
FIG. 4
FIG. 5

POWERED ROLLER CONVEYOR

BACKGROUND

The powered roller conveyors with which I am familiar provide a means for simultaneously rotating all of the rollers. If the conveyors is of substantial length, such as 100 or 200 feet, it takes a large motor to simultaneously rotate all of the rollers under load. Further, in the accumulation mode, there are high pressures between loads. Such simultaneous rotation of all of the rollers may be accomplished by driving a belt in frictional contact with the rollers with the top run of the belt moving in a direction opposite to the direction of movement of the load and include load responsive sensors as per the conveyors in U.S. Pat. Nos. 3,612,248 and 3,770,102 if reduction accumulation pressure is desired.

Another type of powered roller conveyor provides a pad on the belt so that only some of the rollers are driven at any given time. Since the belt top run is moving in a direction opposite to the direction of the load, the load moves intermittently with a jerky movement. Since the rollers adjacent the discharge end of the conveyor are the first ones to be rotatably driven by the frictional contact with a pad on the belt, there may be a substantial time lag before a load at the inlet end of the roller conveyor begins moving.

The present invention is directed to a powered roller conveyor for transportion or accumulation which may utilize a substantially smaller drive motor for rotatably driving a discrete number of rollers substantially smaller in number than the total number of rollers while at the same time providing a conveyor which continuously moves the load in the desired direction, and substantially reduces accumulation pressure without the use of sensors.

SUMMARY OF THE INVENTION

The powered roller conveyor of the present invention includes a frame which supports a plurality of parallel rollers for moving a load in a first direction. The rollers are divided into discrete groups. A motor means is provided for selectively and progressively rotating groups of rollers in timed relation.

The timing for rotatably driving the rollers is such so that one group of rollers starts rotating at or about the time a previous group of rollers ceases to be driven. As a result, a load is caused to continuously move in said direction with the motor means only rotatably driving a discrete number of rollers which number is substantially smaller than the total number of rollers.

It is an object of the present invention to provide a novel powered roller conveyor.

It is another object of the present invention to provide a powered roller conveyor for continuously moving a load in a desired direction while only rotatably driving discrete rollers the number of which is substantially smaller than the total number of rollers.

Other objects will appear hereinafter.

For the purpose of illustrating the invention, there is shown in the drawings a form which is presently preferred; it being understood, however, that this invention is not limited to the precise arrangements and instrumentalities shown.

FIG. 1 is a top plan view of a conveyor in accordance with the present invention.

FIG. 2 is a sectional view taken along the line 2—2 in FIG. 1 but on an enlarged scale with diagrammatic illustration of controls.

FIG. 3 is a sectional view taken along the line 3—3 in FIG. 2.

FIG. 4 is a partial sectional view taken along the line 4—4 in FIG. 2.

FIG. 5 is a partial illustration of a timing bar chart.

Referring to the drawing in detail, wherein like numerals indicate like elements, there is shown in the drawings a powered roller conveyor in accordance with the present invention designated generally as 10.

The conveyor 10 has a frame which includes side frames 12 and 14 rotatably supporting a plurality of parallel rollers 16. The rollers 16 are equally spaced from one another. In a typical installation, roller 16 having a diameter of about 2 inches would be installed on 3 inch centers.

The rollers 16 are arranged in groups 18, 20, 21, etc. with the last group being designated 22. See FIG. 1. The number of rollers 16 per group is variable and will differ from installation to installation depending upon the length of the load and/or the length of the conveyor. For example, if the conveyor 10 is 120 feet long, there may be twelve groups of rollers with approximately forty rollers in each group. For purposes of illustration, the drawings illustrate six of the rollers 16 per group.

The conveyor 10 includes a subframe designated generally as 24. See FIG. 3. The subframe 24 includes a plurality of transversely extending brace members 25 at spaced points along the conveyor 10. The brace members 25 extend between the side frames 12 and 14. A pair of upright subframe portions 26 and 28 are spaced from one another and extend longitudinally along the frame. Portions 26, 28 are supported by the brace members 25.

A pulley 30 is secured to a transversely disposed shaft 31 at the discharge end of the conveyor 10. See the lefthand end of FIGS. 1 and 2. The length of pulley 30 corresponds generally to the width of belting to be used for the given system. A drive pulley 32 is mounted on shaft 33 at the inlet end of the conveyor 10. See the righthand end of FIGS. 1 and 2. Drive pulley 34 has a length corresponding generally to the length of pulley 30. The shafts 31, 33 are rotatably supported at their ends by the side frames 12 and 14.

A motor 36 is coupled to the drive shaft 33 by way of a reducer 38. Motor 36 and reducer 38 are mounted on any convenient support plate 40. Conveyors of the type involved herein were developed to convey stacks of corrugated board 6 feet high and weighing 100 pounds per square foot and for accumulating the stacks on conveyors having a length of 60 to 120 feet. Nominal exiting speed is 40 fpm. A normal live roll conveyor 6 feet wide and 120 feet long would handle a total load of 72,000 pounds and require a drive motor of 15 hp. By contrast, the conveyor 10 of the same length and loading can be powered with motor 36 being 1½ horsepower or less.

Referring particularly to FIG. 3, the subframe 24 includes a channel member 42 having a reaction surface such as bottom wall 52 and is disposed between and guided for vertical movement by the subframe portions 26 and 28. The rollers of group 20 are provided with a similar channel member 44 having a bottom wall 54. The rollers of group 21 are provided with a similar channel member 46. The rollers of group 22 are provided with a similar channel member 48.

A plurality of pressure rollers 50 are supported by the channel member 42 adjacent the upper end thereof. The spacing between pressure rollers 50 corresponds generally to twice the spacing between rollers 16. In a preferred embodiment, the number of rollers 50 corresponds with half the number of rollers 16 and they are centered below two adjacent carrying rollers 16. It will be noted that the rollers 50 associated with channel member 42 are spaced from the rollers 16 so as to accommodate the top run of belt 34 while the bottom run of belt 34 is accommodated within the channel member 42 for movement therewith.

A discrete elevating means 56 is provided in connection with each of the groups 18–22. Each elevating means includes an expansible means 58 such as a fire hose. Other equivalent devices including air operated pads or cylinders can be used. The expansible means associated with group 20 is designated 58'. The elevating means 56 includes a guide 60 for the expansible means 58 and is constructed as shown in FIG. 3 so as to permit contact between the expansible means 58 and the reaction surface such as wall 52 on the channel member 42.

A fluid is utilized to selectively elevate channel member 42 by way of conduit 62. Conduit 62 has one end connected to one end of the expansible means 58. The other end of expansible means 58 is closed. Conduit 62 at its other end is connected to a supply and exhaust valve 64. Valve 64 is preferably operated by a solenoid which may be referred to hereafter as solenoid A.

Valve 64 selectively communicates with an inlet manifold 66 and an outlet manifold 68. Manifold 66 is connected to the output side of a continuously operable pump 70. The inlet side of pump 70 is below liquid level in a reservoir 72. The exhaust manifold 68 communicates with the reservoir 72. As illustrated in FIG. 2, a hydraulic system is provided. Since the word "fluid" includes liquids and gases, it should be apparent to those skilled in the art that a pneumatic system may be utilized instead of a hydraulic system.

The supply and exhaust valve for controlling flow to the expansible means 58' is designated 74. Valve 74 has a solenoid operator which may be referred to hereinafter as solenoid B. Similarly, the supply and exhaust valve 76 associated with roller group 22 has a solenoid operator which may be referred to as solenoid C.

The conveyor 10 is provided with a control panel 78 having a commercially available timer 80 for sequentially controlling the operative time period for the solenoids A, B, C, etc. As shown in FIG. 5, the solenoids A, B, C, etc. are sequentially operative to supply motive fluid to their associated expansible means for a set period of time. At or about expiration of the time during which solenoid A is in an operative position wherein motive fluid is supplied to expansible means 58, solenoid B is operated so that valve 74 will supply motive fluid to the next adjacent expansible means a5'. In this manner, the rollers 16 of group 20 will start to rotate at or about the time the rollers 16 of group 18 cease to be driven. Timer 80 may be of the type having a synchronous motor drive cam shaft or may be a series of relays controlled by a clock timer. Also, timer 80 may be a slave-driven by conveyor motor 36.

The operation of the conveyor 10 should be readily apparent in view of the above description and the drawings attached hereto. By using a reversible motor 36, either end of the conveyor 10 may be the inlet end. In the illustrated embodiment, the motor 36 causes the top run of belt 34 to move from left to right in FIG. 2. When valve 64 is in a supply orientation, expansible means 58 is expanded from a collapsed position as shown in FIG. 3 to a position wherein it elevates the channel 42, rollers 50 supported thereby, and a portion of the top run of belt 34 so that said portion of belt 34 has frictional contact with the rollers 16.

During the short period of time that channel 42 is elevated, the moving top run of belt 34 frictionally drives each of the rollers 16 associated with group 18 to move the load from right to left in FIG. 2. When the timer 80 times out, valve 64 is shifted by its solenoid A to an exhaust position whereby the motive fluid is exhausted from expansible means 58 via exhaust conduit 68 to the reservoir 72. The weight of the channel member 42 and its rollers 50 assist in collapsing the expansible means 58 to the position shown in FIG. 3.

When exhausting expansible means 58, the timer 80 activates solenoid B whereby valve 74 supplies motive fluid from the manifold 66 to the expansible means 58'. As shown in FIGS. 2 and 4, expansible means 58' is an expanded position whereby a portion of the top run of the belt 34 is frictionally driving the rollers 16 of roller group 20. Hence, the load can be continuously moved along the conveyor 10 due to the fact that the first roller of roller group 20 has commenced rotating before the last roller of group 18 has stopped rotating.

The motor 36 and timer 80 may be provided with a photocell actuator 81 and a foot pedal actuator 82. Alternatively, motor 36 may be provided with a limit switch actuator positioned adjacent the discharge end so that it may be tripped whenever there is a vehicle or other receiver in a position to receive the load as it discharges from the conveyor 10. It is not necessary to wait for a load to traverse the entire length of the conveyor 10 before placing another load on the conveyor 10. Depending upon the desired throughput, the timer 80 controlling the solenoids A, B, C, etc. may repeat the process to start moving a second load down the length of conveyor 10 before the first load has traversed the length of conveyor 10 in response to actuation of switch 82 or photocell 81.

If, for example, three loads are accumulated and at rest against a stop mechanism at the discharge end of conveyor 10, the groups of rollers 16 can be powered in reverse order by timer 80 with a belt tension sensor stopping the sequence at the fourth group of rollers 16. In this manner, each load is moved forward the distance of one group of rollers 16.

The belt 34 is substantially narrower than the length of the rollers 16 and the motor 36 is substantially smaller than a motor which would be necessary if all rollers 16 were simultaneously driven. It will be understood that a number of components are not illustrated in the drawings such as wires, relays, bearings, etc. since they are unnecessary from understanding the invention and would unnecessarily complicate the disclosure.

In addition to the savings resulting from the use of a smaller motor 36 as explained above, the conveyor of this invention results in a saving of energy since only conveyor portions in use are energized. Accumulation pressure at the head end of a standard conveyor may vary from 500 to 2000 pounds which can damage loads and require a massive stop mechanism to hold the accumulated load at rest. In the conveyor 10, with only one group of rollers 16 being powered, there is a substantial decrease in accumulation pressure. Other advantages include a lower operating noise level and lower maintenance.

The present invention may be embodied in other specific forms without departing from the spirit or essential attributes thereof and, accordingly, reference should be made to the appended claims, rather than to the foregoing specification as indicating the scope of the invention.

It is claimed:

1. A powered roller conveyor comprising a frame supporting a plurality of parallel rollers for moving a load in a first direction, means dividing said rollers into groups, selectively operable drive means for progressively rotating groups of said rollers in timed relation so that the rollers of one group of rollers commence being driven at about the time rollers of a previous group of rollers stop being driven whereby a load is caused to continuously more in said direction with the drive means only rotatably driving a discrete number of the rollers at any given time which number is substantially smaller than the total number of rollers, said selectively operable driven means including an endless belt driven by a motor so as to cause the top run of the belt to move in a direction opposite to said first direction, and a plurality of discrete elevating means along the length of said belt and controlled by a timer means forming part of said drive means for sequentially elevating a portion of the top run of the belt into frictional contact with the rollers of one of said roller groups in a manner so that discrete groups of rollers are progressively driven in said first direction.

2. A conveyor in accordance with claim 1 wherein the expansible means associated with each elevating means is a length of hose, said lengths of hose being aligned in said direction.

3. A conveyor in accordance with claim 1 wherein said elevating means includes discrete portions of a subframe below said roller groups at spaced points along the length of said frame, each elevating means including a discrete lifting means for causing movement of a subframe portion in a vertical direction toward one of said roller groups thereabove.

4. A conveyor in accordance with claim 3 wherein each subframe portion includes a plurality of pressure rollers above the expansible means thereon for supporting the bottom surface of the top run of the belt and movable vertically as a unit by a support having a reaction surface for cooperation with the expansible means associated therewith.

5. A conveyor in accordance with claim 1 wherein said drive means includes a subframe below the elevation of said roller groups, said subframe including an endless belt having a top run driven in a direction opposite to said first direction, said subframe including a plurality of aligned members each supporting a plurality of pressure rollers in rolling contact with a bottom surface of the top run of said belt, and discrete expansible means associated with a reaction surface on said pressure roller support members for selectively elevating the pressure roller support members and an associated portion of the top run of said belt to a position wherein a portion of the top run of said belt frictionally drives the rollers of one of said roller groups.

6. A powered roller conveyor comprising a frame supporting a plurality of parallel rollers for moving a load in a direct direction, selectively operable means for progressively rotating groups of said rollers in timed relation by a timer beginning at the inlet end of the conveyor so that a first group of rollers are driven while the remaining rollers are not driven and then the next group of rollers in said direction commence being driven at about the time the first group of rollers cease being driven whereby a load is caused to continuously move in said direction while only rotatably driving a discrete number of the rollers at any given time which number is substantially smaller than the total number of rollers, said selectively operable means including an endless belt driven by a motor so as to cause the top run of the belt to move in a direction opposite to said first direction, a plurality of discrete elevating means along the length of said belt for sequentially elevating a portion of the top run of the belt into frictional contact with the rollers of one of said roller groups while also elevating a portion of the bottom run of said belt, said elevating means including discrete portions of a subframe below the elevation of said roller groups at spaced points along the length of said frame.

7. A conveyor in accordance with claim 6 wherein each elevating means including a discrete fluid expansible means for causing movement of a subframe portion in a vertical direction toward the elevation of said roller groups, and each subframe portion including a plurality of idler rollers for supporting the bottom surface of the top run of the belt and movable vertically therewith.

8. A conveyor in accordance with claim 7 wherein each expansible means is a finite length of hose, said hoses being aligned and extending in said first direction.

* * * * *